(12) United States Patent
Yamaguchi

(10) Patent No.: US 9,016,416 B2
(45) Date of Patent: Apr. 28, 2015

(54) VEHICLE FRONT STRUCTURE

(75) Inventor: Junichi Yamaguchi, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/364,837

(22) PCT Filed: Dec. 15, 2011

(86) PCT No.: PCT/JP2011/079092
§ 371 (c)(1),
(2), (4) Date: Jun. 12, 2014

(87) PCT Pub. No.: WO2013/088562
PCT Pub. Date: Jun. 20, 2013

(65) Prior Publication Data
US 2014/0326523 A1 Nov. 6, 2014

(51) Int. Cl.
| | |
|---|---|
| *B60K 11/04* | (2006.01) |
| *B62D 25/08* | (2006.01) |
| *B62D 21/15* | (2006.01) |
| *B60R 19/34* | (2006.01) |
| *B60R 19/48* | (2006.01) |

(52) U.S. Cl.
CPC ............ *B62D 25/084* (2013.01); *B62D 21/152* (2013.01); *B60R 19/34* (2013.01); *B60R 19/48* (2013.01)

(58) Field of Classification Search
USPC .................. 180/68.4, 68.6, 232; 296/193.09, 296/187.03, 187.04, 187.09; 280/784
See application file for complete search history.

(56) References Cited

U.S. PATENT DOCUMENTS

| | | | | |
|---|---|---|---|---|
| 5,984,403 | A  * | 11/1999 | Kuroda .................... | 296/187.03 |
| 6,152,521 | A  * | 11/2000 | Hayashi et al. .......... | 296/187.09 |
| 6,260,609 | B1 * | 7/2001 | Takahashi ........................ | 165/69 |
| 6,412,581 | B2 * | 7/2002 | Enomoto et al. ............. | 180/68.4 |
| 6,705,668 | B1 * | 3/2004 | Makita et al. ............. | 296/187.03 |

(Continued)

FOREIGN PATENT DOCUMENTS

| | | |
|---|---|---|
| JP | 2002-249075 | 9/2002 |
| JP | 2006-511390 | 4/2006 |
| JP | 2010-285045 | 12/2010 |

OTHER PUBLICATIONS

International Search Report issued Mar. 13, 2012, in PCT/JP2011/079092, filed Dec. 15, 2011.

*Primary Examiner* — Hau Phan
*Assistant Examiner* — Jacob Meyer
(74) *Attorney, Agent, or Firm* — Oblon, McClelland, Maier & Neustadt, L.L.P.

(57) ABSTRACT

A vehicle front structure according to the present invention includes: a bumper reinforcement disposed on a vehicle front end side with a vehicle width direction as its longitudinal direction; and paired front side members disposed on respective sides of a vehicle front portion with a vehicle front-rear direction as their longitudinal direction. Front ends of the front side members in the vehicle front-rear direction are connected to the bumper reinforcement via paired crash boxes. A plurality of vulnerable portions provided at intervals in the vehicle front-rear direction are formed in each of the crash boxes. Further, a vehicle cooling device is disposed between the paired crash boxes. Paired support members configured to support the vehicle cooling device are connected to the respective crash boxes between the vulnerable portions adjacent to each other when viewed from the vehicle width direction.

4 Claims, 8 Drawing Sheets

(56) References Cited

U.S. PATENT DOCUMENTS

| | | | |
|---|---|---|---|
| 6,758,515 B2 * | 7/2004 | Ozawa et al. | 296/187.09 |
| 7,108,092 B2 * | 9/2006 | Suwa et al. | 180/68.4 |
| 7,270,368 B2 * | 9/2007 | Aonuma et al. | 296/203.02 |
| 7,410,018 B2 * | 8/2008 | Satou | 180/68.4 |
| 7,614,658 B2 * | 11/2009 | Yamada | 280/784 |
| 7,770,927 B2 * | 8/2010 | Dandekar et al. | 280/784 |
| 7,896,428 B2 * | 3/2011 | Tamakoshi et al. | 296/187.03 |
| 7,900,964 B2 * | 3/2011 | Chretien et al. | 280/784 |
| 7,963,355 B2 * | 6/2011 | Mishima | 180/68.4 |
| 7,992,926 B2 * | 8/2011 | Tamakoshi | 296/187.09 |
| 8,151,921 B2 * | 4/2012 | Okabe et al. | 180/68.4 |
| 8,246,105 B2 * | 8/2012 | Mildner | 296/187.09 |
| 8,403,403 B2 * | 3/2013 | Tashiro et al. | 296/187.09 |
| 8,550,543 B2 * | 10/2013 | Yoshida | 296/187.09 |
| 8,789,874 B2 * | 7/2014 | Okamura et al. | 296/187.09 |
| 2002/0129981 A1 * | 9/2002 | Satou | 180/68.6 |
| 2003/0168886 A1 * | 9/2003 | Ozawa et al. | 296/187.09 |
| 2005/0218645 A1 * | 10/2005 | Shinta et al. | 280/784 |
| 2006/0152022 A1 | 7/2006 | Rech-Linker et al. | |
| 2008/0164684 A1 * | 7/2008 | Yamada | 280/784 |
| 2009/0266634 A1 * | 10/2009 | Obayashi et al. | 180/68.4 |
| 2009/0315311 A1 * | 12/2009 | Tamakoshi | 280/784 |
| 2010/0314426 A1 | 12/2010 | Yokoi et al. | |
| 2011/0193371 A1 * | 8/2011 | Klimek | 296/187.09 |
| 2014/0091585 A1 * | 4/2014 | Ramoutar et al. | 293/133 |

\* cited by examiner

VEHICLE FRONT STRUCTURE

TECHNICAL FIELD

The present invention relates to a vehicle front structure.

BACKGROUND ART

There has been known a vehicle cooling unit support structure including a support bracket for supporting a radiator support side disposed inside a crash box in a vehicle width direction (for example, Patent Document 1). In the vehicle cooling unit support structure described in Patent Document 1, the support bracket is provided in a connection portion between a front side member and the crash box. This allows the support bracket not to interfere with the crash box at the time when the crash box is deformed in a compressive manner along an axial direction due to a vehicle front collision (hereinafter just referred to as "front collision").
Patent Document 1: Japanese Patent Application Publication No. 2010-285045 (JP 2010-285045 A)

SUMMARY OF THE INVENTION

Problem to be Solved by the Invention

However, in the vehicle cooling unit support structure described in Patent Document 1, the support bracket is required, and thus, the number of components increases. In the meantime, if the support bracket is omitted and the radiator support side is connected to a side surface of the crash box, the radiator support side resists the compressive deformation of the crash box along the axial direction, which may obstruct the compressive deformation of the crash box along the axial direction.

In consideration of the above facts, an object of the present invention is to provide a vehicle front structure which is able to reduce a resisting force of a support member against a compressive deformation of a crash box along an axial direction and which allows the support member to be connected to the crash box.

Means for Solving the Problem

A vehicle front structure according to a first aspect of the present invention includes: a bumper reinforcement disposed on a vehicle front end side with a vehicle width direction as its longitudinal direction; paired front side members disposed on respective sides of a vehicle front portion with a vehicle front-rear direction as their longitudinal direction; paired crash boxes configured to connect the bumper reinforcement to respective front ends of the paired front side members in the vehicle front-rear direction, each of the paired crash boxes including a plurality of vulnerable portions formed thereon at intervals in the vehicle front-rear direction; and paired support members configured to support a vehicle cooling device disposed between the paired crash boxes, each of the support members being connected to the crash box between the vulnerable portions adjacent to each other when viewed from the vehicle width direction.

According to the vehicle front structure of the first aspect of the present invention, a plurality of vulnerable portions is formed in each of the paired crash boxes at intervals in the vehicle front-rear direction. Accordingly, when a collision load of a predetermined value or more is input to the crash box from the bumper reinforcement toward a rear side in the vehicle front-rear direction due to a front collision or the like, for example, the crash box is deformed in a compressive manner along its axial direction. Hereby, a collision energy due to the front collision or the like is absorbed.

Here, support members configured to support a vehicle cooling device are connected to the respective crash boxes. The support members are connected to the respective crash boxes between the vulnerable portions adjacent to each other when viewed from the vehicle width direction. Accordingly, in comparison with a configuration in which a support member is connected to a crash box at a position where the support member is overlapped with a vulnerable portion when viewed from the vehicle width direction, a resisting force of the support member against a compressive deformation of the crash box along the axial direction is reduced. That is, the crash box is easy to be deformed in a compressive manner along the axial direction, thereby restraining a decrease in collision-energy absorption performance of the crash box.

Thus, in the present invention, it is possible to reduce the resisting force of the support member against the compressive deformation of the crash box along the axial direction and to connect the support member to the crash box.

A vehicle front structure according to a second aspect of the present invention is such that: in the vehicle front structure according to the first aspect of the present invention, the support member is connected to the crash box in an intermediate part between the vulnerable portions adjacent to each other when viewed from the vehicle width direction.

According to the vehicle front structure of the second aspect of the present invention, the support member is connected to the crash box in the intermediate part between the vulnerable portions adjacent to each other when viewed from the vehicle width direction, so that the resisting force of the support member against the compressive deformation of the crash box along the axial direction is further reduced.

Note that the intermediate part between the vulnerable portions adjacent to each other, as used herein, indicates that part of the crash box which is positioned between the vulnerable portions adjacent to each other and which excludes both ends thereof in the vehicle front-rear direction, when viewed from the vehicle width direction.

A vehicle front structure according to a third aspect of the present invention is such that: in the vehicle front structure according to the first aspect of the present invention, the support member is connected to the crash box in a central part between the vulnerable portions adjacent to each other when viewed from the vehicle width direction.

According to the vehicle front structure of the third aspect of the present invention, the support member is connected to the crash box in the central part between the vulnerable portions adjacent to each other when viewed from the vehicle width direction, so that the resisting force of the support member against the compressive deformation of the crash box along the axial direction is further reduced.

A vehicle front structure according to a fourth aspect of the present invention is such that: in the vehicle front structure according to any one of the first to third aspects of the present invention, at least three vulnerable portions are formed in the crash box, and the support member includes: a front flange portion connected to a side wall portion of the crash box between one set of the vulnerable portions adjacent to each other when viewed from the vehicle width direction, and a rear flange portion disposed behind the front flange portion in the vehicle front-rear direction, the rear flange portion being connected to the side wall portion of the crash box between another set of the vulnerable portions adjacent to each other when viewed from the vehicle width direction.

According to the vehicle front structure of the fourth aspect of the present invention, the front flange portion of the support member is connected to the side wall portion of the crash box between one set of the vulnerable portions adjacent to each other when viewed from the vehicle width direction, and the rear flange portion of the support member is connected to the side wall portion of the crash box between another set of the vulnerable portions adjacent to each other, thereby making it possible to reduce the resisting force of the support member against the compressive deformation of the crash box along the axial direction and to improve support performance of the support member.

A vehicle front structure according to a fifth aspect of the present invention is such that: in the vehicle front structure according to any one of the first to fourth aspects of the present invention, the vulnerable portions are notches, projection portions, recessed portions, or through holes formed in the crash box.

According to the vehicle front structure of the fifth aspect of the present invention, notch portions, projection portions, recessed portions, or through holes are formed as the vulnerable portions in the crash box. Accordingly, when a collision load of a predetermined value or more is input to the crash box from the bumper reinforcement toward a rear side in the vehicle front-rear direction due to a front collision or the like, the crash box is deformed in a compressive manner along its axial direction. Hereby, a collision energy due to the front collision or the like is absorbed.

Advantageous Effects of Invention

As described above, according to the vehicle front structure of the present invention, it is possible to reduce a resisting force of a support member against a compressive deformation of a crash box along an axial direction and to connect the support member to the crash box.

MODES FOR CARRYING OUT THE INVENTION

The following describes a vehicle front structure according to one embodiment of the present invention, with reference to the drawings. Note that an arrow FR shown appropriately in each figure indicates a front side in a vehicle front-rear direction, an arrow UP indicates an upper side in a vehicle up-down direction, and an arrow OUT indicates an outer side (a vehicle-interior outer side) in a vehicle width direction.

Initially described is a schematic configuration of the vehicle front structure according to the present embodiment.

Figure 1:
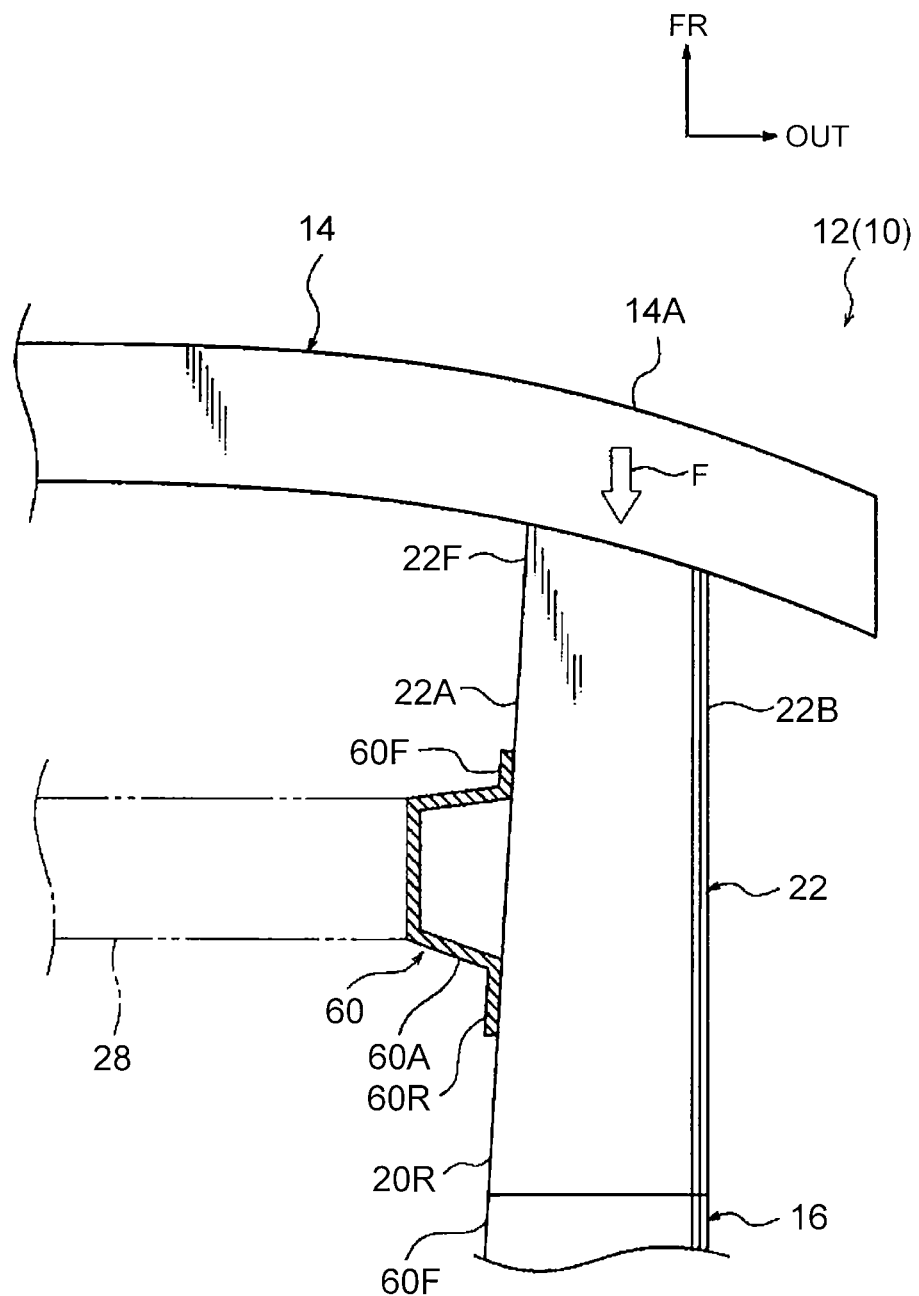
FIG. 1 is a plane view schematically illustrating a vehicle-body right side part of a vehicle to which a vehicle front structure according to one embodiment of the present invention is applied.

FIG. 1 illustrates a vehicle-body right side part of a vehicle 12 to which a vehicle front structure 10 according to the present embodiment is applied. The vehicle front structure 10 includes a bumper reinforcement 14, front side members 16, crash boxes 22, a vehicle cooling device 28, and radiator supports 60 as support members. Note that a vehicle-body left side part of the vehicle 12 is configured to be line symmetric to the vehicle-body right side part about a central part of the bumper reinforcement 14 in a longitudinal direction, and the vehicle-body left side part is provided with the side member, the crash box, and the like (not shown).

The bumper reinforcement 14 is disposed on a front end side of the vehicle 12 with the vehicle width direction being taken as its longitudinal direction. The front side member 16 is disposed on a rear side, in the vehicle front-rear direction, of a longitudinal-direction end portion 14A of the bumper reinforcement 14.

The front side members 16 are disposed on respective sides of a front portion (a vehicle front portion) of the vehicle 12, with the vehicle front-rear direction being taken as their longitudinal direction. Each of the crash boxes 22 for absorbing a collision energy is disposed between the bumper reinforcement 14 and a front end 16F of each of the front side members 16 in the vehicle front-rear direction. The crash boxes 22 provided in pair are disposed with the vehicle front-rear direction being taken as their axial direction (an axis O direction in FIG. 3). A front end 22F of the crash box 22 in the vehicle front-rear direction is connected to the end portion 14A of the bumper reinforcement 14, and a rear end 22R thereof in the vehicle front-rear direction is connected to the front end 16F of the front side member 16. That is, by means of the crash boxes 22 provided in pair, the bumper reinforcement 14 is connected to the front ends 22F of the front side members 16 provided in pair.

The vehicle cooling device 28 is disposed inside the crash boxes 22 in the vehicle width direction. Note that an outer shape of the vehicle cooling device 28 is illustrated with alternate long and two short dashes lines in FIG. 1. The vehicle cooling device 28 cools off cooling water that cools down an engine (not shown), and is disposed between the crash boxes 22 that are provided in pair to be opposed to each other in the vehicle width direction. The vehicle cooling device 28 includes a radiator core, a cooling fan, and so on, and is supported by the crash boxes 22 via the radiator supports 60.

The radiator support 60 is disposed on an inner side of the crash box 22 in the vehicle width direction, with the vehicle up-down direction being taken as its longitudinal direction. Further, the radiator support 60 is formed to have a hat-like section that is opened toward the crash box 22 (an outer side in the vehicle width direction), and is connected to an inner wall portion 22A, which is a side portion of the crash box 22. A side portion of the vehicle cooling device 28 is connected to the radiator support 60 via bolts or the like (not shown).

Next will be described configurations of the front side member 16, the crash box 22, and the radiator support 60, more specifically.

Figure 2:
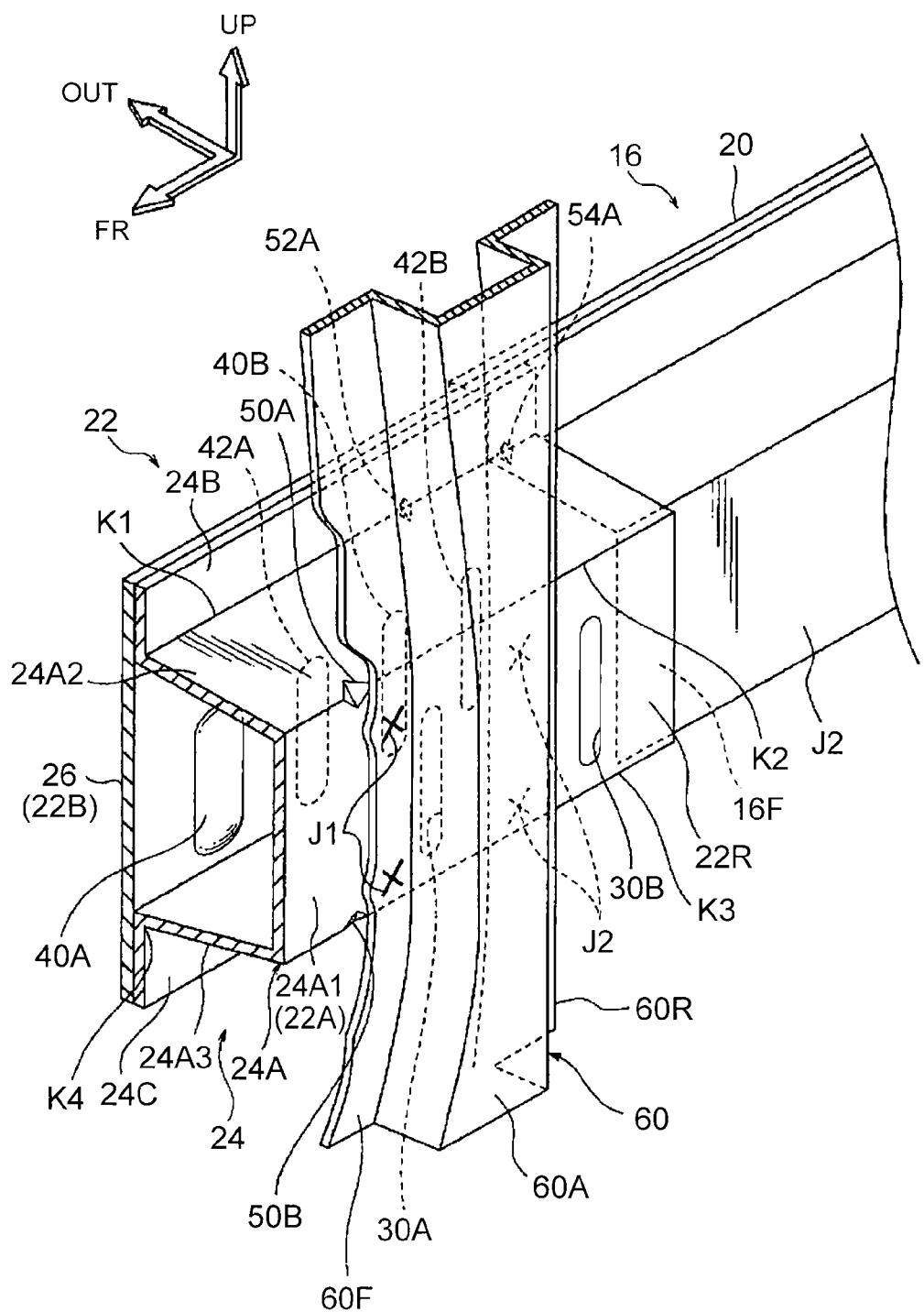
FIG. 2 is a perspective view illustrating a connecting structure between a crash box and a radiator support illustrated in FIG. 1.

As illustrated in FIG. 2, the front side member 16 includes a front side member inner panel (hereinafter referred to as "inner panel") 18, and a front side member outer panel (hereinafter referred to as "outer panel") 20 disposed on an outer side of the inner panel 18 in the vehicle width direction. The inner panel 18 is formed to have a hat-like section that is opened toward the outer panel 20 (the outer side in the vehicle width direction), and is connected to the outer panel 20 having a plate-like shape. A closed section structure is thus constituted by the inner panel 18 and the outer panel 20.

The crash box 22 includes a crash box inner panel (hereinafter referred to as "inner panel") 24, and a crash box outer panel (hereinafter referred to as "outer panel") 26 disposed on an outer side of the inner panel 24 in the vehicle width direction. The inner panel 24 is formed to have a hat-like section that is opened toward the outer panel 26.

More specifically, the inner panel 24 includes: a body portion 24A having a generally U-shaped section that is opened toward the outer panel 26; an upper flange portion 24B provided in an upper open end of the body portion 24A in the vehicle up-down direction; and a lower flange portion 24C provided in a lower open end of the body portion 24A in the vehicle up-down direction. The upper flange portion 24B and the lower flange portion 24C are connected to the outer panel 26 having a plate-like shape, by welding or the like. Hereby, a closed section structure is constituted by the inner panel 24 and the outer panel 26. Further, the inner wall portion 22A on an inner side of the crash box 22 in the vehicle width direction is constituted by a side wall portion 24A1 on an inner side of the body portion 24A in the vehicle width direction, and an outer wall portion 22B on an outer side of the crash box 22 in the vehicle width direction is constituted by the outer panel 26. The front end 16F of the front side member 16 is connected, by welding or the like, to the rear end 22R of the crash box 22 thus configured.

Figure 3:
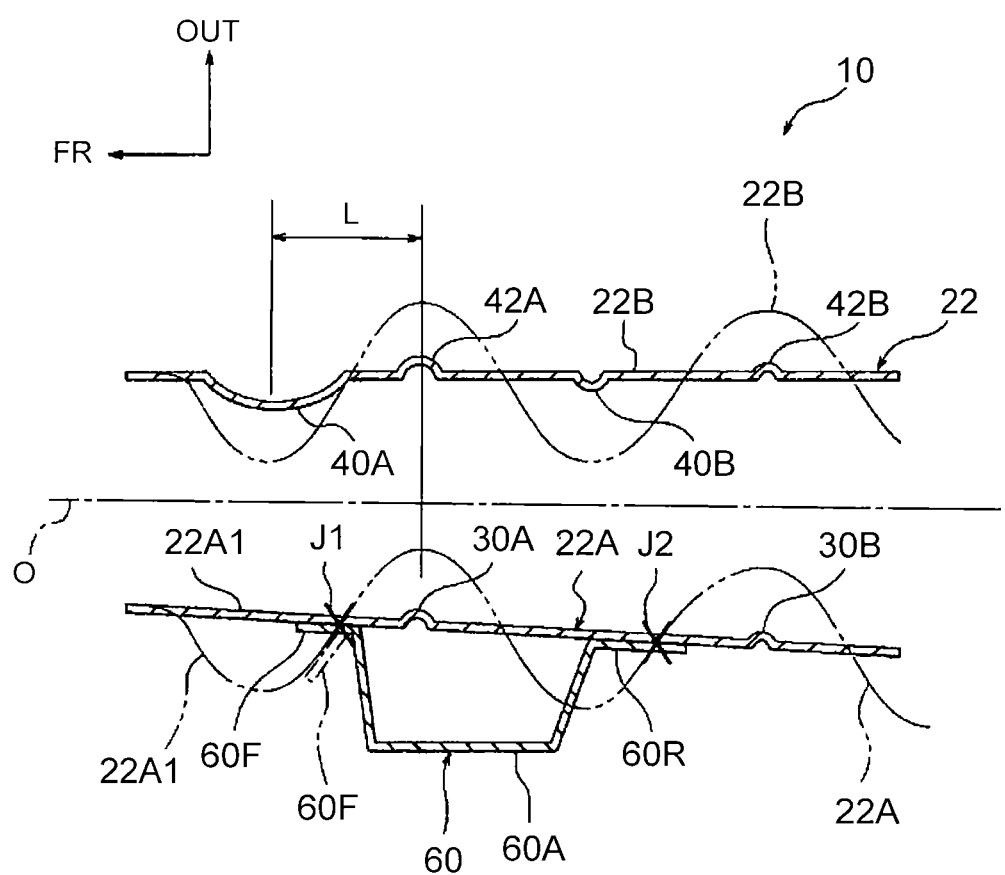
FIG. 3 is a horizontal sectional view of the crash box and the radiator support illustrated in FIG. 2.

Two recessed portions 30A, 30B serving as vulnerable portions are formed on the inner wall portion 22A of the crash box 22. The recessed portions 30A, 30B extend in the vehicle up-down direction, and are disposed at a predetermined interval in the axial direction of the crash boxes 22 when viewed from the vehicle width direction. Further, as illustrated in FIG. 3, the recessed portions 30A, 30B form recessed sections that are recessed toward the outer wall portion 22B (the outer side in the vehicle width direction) from the other part (a reference plane) of the inner wall portion 22A of the crash box 22. Hereby, when a collision load F of a predetermined value or more toward a rear side in the vehicle front-rear direction acts on the crash box 22 from the bumper reinforcement 14 (see FIG. 1), the inner wall portion 22A is easy to bend in a projecting manner toward the outer panel 26 with each of the recessed portions 30A, 30B as an apex.

In the meantime, as illustrated in FIG. 2, in the outer wall portion 22B of the crash box 22, two recessed portions 40A, 40B as vulnerable portions and two projection portions 42A, 42B as vulnerable portions are formed. The recessed portions 40A, 40B and the projection portions 42A, 42B extend in the vehicle up-down direction, and are alternately disposed at predetermined intervals in the axial direction of the crash boxes 22 when viewed from the vehicle width direction. Further, as illustrated in FIG. 3, the recessed portions 40A, 40B form recessed sections that are recessed toward the inner wall portion 22A (the inner side in the vehicle width direction) from the other part (a reference plane) of the outer wall portion 22B. Conversely, the projection portions 42A, 42B form projection sections that project toward a side opposite to the inner wall portion 22A (the outer side in the vehicle width direction) from the other part (the reference plane) of the outer wall portion 22B. The projection portions 42A, 42B are opposed, respectively, to the recessed portions 30A, 30B formed on the inner wall portion 22A of the crash box 22, in the vehicle width direction. Hereby, when the collision load F of a predetermined value or more toward the rear side in the vehicle front-rear direction acts on the crash box 22 from the bumper reinforcement 14 (see FIG. 1), the outer wall portion 22B is easy to bend in a projecting manner toward the inner wall portion 22A with each of the recessed portions 40A, 40B as an apex, and the outer wall portion 22B is easy to bend in a projecting manner toward the side opposite to the inner wall portion 22A with each of the projection portions 42A, 42B as an apex.

Figure 4:
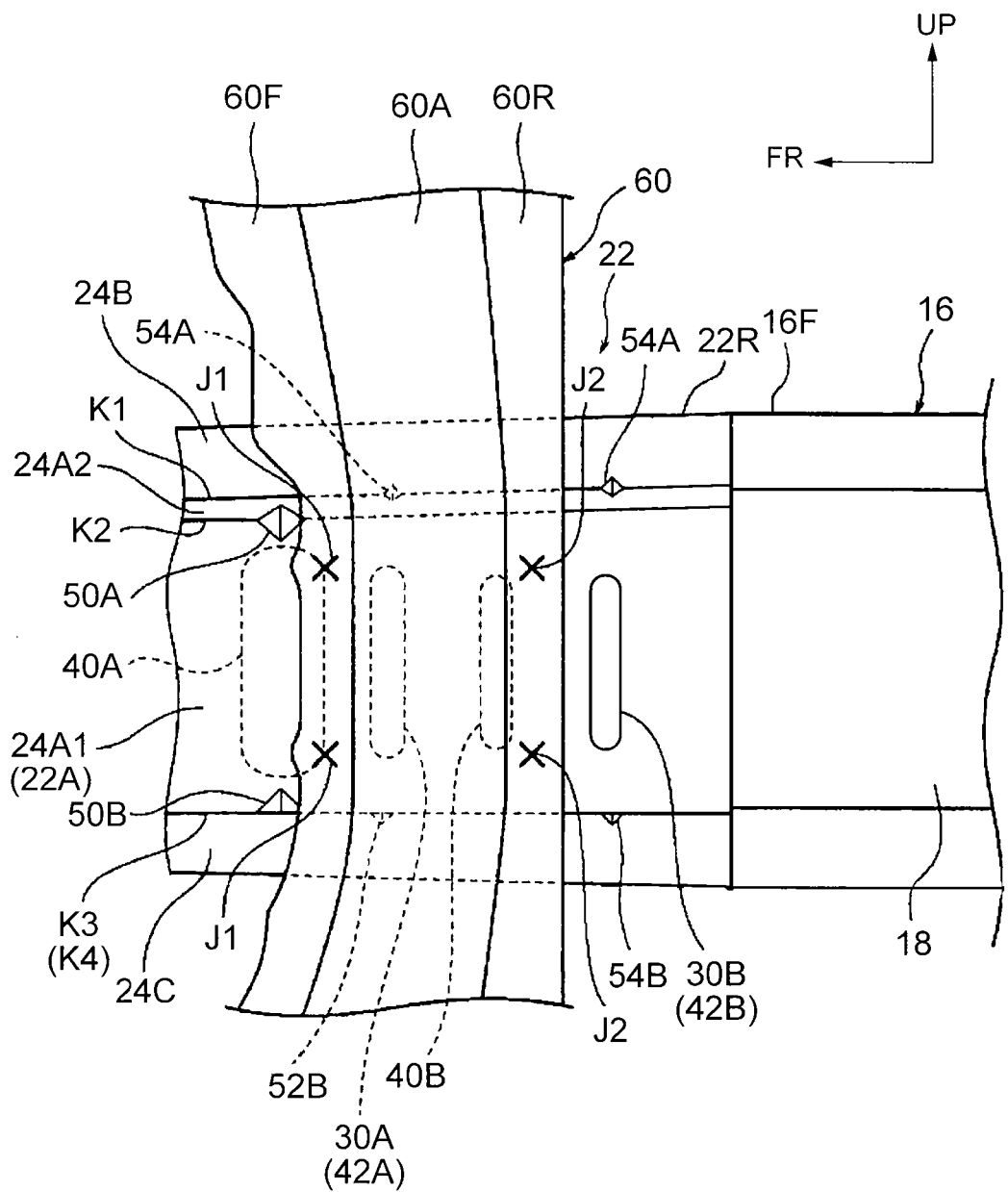
FIG. 4 is a side view of the crash box and the radiator support illustrated in FIG. 2, when viewed from an inner side in a vehicle width direction.

Further, as illustrated in FIG. 4, in bent portions K1 to K4 (edge line portions) in the inner panel 24 of the crash box 22, six notches 50A, 50B, 52A, 52B, 54A, 54B are formed as vulnerable portions. More specifically, the notches 50A, 50B are formed, respectively, in the bent portion K2 between the side wall portion 24A1 and an upper wall portion 24A2 of the body portion 24A in the inner panel 24, and in the bent portion K3 between the side wall portion 24A1 and a lower wall portion 24A3 (see FIG. 2). In the notches 50A, 50B, the bent portions K2, K3 are cut out partially, so that rigidities at the notches 50A, 50B in the vehicle width direction are lower than the other parts of the bent portions K2, K3. When viewed from the vehicle width direction, the notches 50A, 50B are disposed at respective sides of the recessed portion 40A in the vehicle up-down direction which recessed portion 40A is formed on the outer wall portion 22B of the crash box 22.

Further, two notches 52A, 54A are formed in the bent portion K1 between the upper wall portion 24A2 and the upper flange portion 24B of the body portion 24A in the inner panel 24. Further, two notches 52B, 54B are formed in the bent portion K4 between the lower wall portion 24A3 and the lower flange portion 24C of the body portion 24A. In the notches 52A, 52B, 54A, 54B, the bent portions K1, K4 are cut out partially, so that rigidities at the notches 52A, 52B, 54A, 54B in the vehicle width direction are lower than the other parts of the bent portions K1, K4. When viewed from the vehicle width direction, the two notches 52A, 52B are disposed at respective sides, in the vehicle up-down direction, of each of the recessed portion 30A and the projection portion 42A formed, respectively, on the inner wall portion 22A and on the outer wall portion 22B of the crash box 22. Further, when viewed from the vehicle width direction, the two notches 54A, 54B are disposed at respective sides, in the vehicle up-down direction, of each of the recessed portion 30B and the projection portion 42B formed, respectively, on the inner wall portion 22A and on the outer wall portion 22B of the crash box 22.

According to the recessed portions 30A, 30B, 40A, 40B, the projection portions 42A, 42B, and the notches 50A, 50B, 52A, 52B, 54A, 54B provided as the vulnerable portions configured as described above, when the collision load F of a predetermined value or more is input to the crash box 22 from the bumper reinforcement 14 (see FIG. 1) toward the rear side in the vehicle front-rear direction, the crash box 22 is controlled to be deformed in a compressive manner along the axial direction. More specifically, as illustrated with alternate long and two short dashes lines in FIG. 3, when the collision load F of a predetermined value or more is input to the crash box 22 from the bumper reinforcement 14 toward the rear side in the vehicle front-rear direction, the inner wall portion 22A and the outer wall portion 22B of the crash box 22 are deformed in a bending manner in a waveform that forms an alternately recessed and projecting shape in the vehicle width direction with each of the recessed portions 30A, 30B, 40A, 40B and each of the projection portions 42A, 42B as an apex, in a horizontal sectional view.

Note that, in the present embodiment, the recessed portions 30A, 30B, 40A, 40B, the projection portions 42A, 42B, and the notches 50A, 50B, 52A, 52B, 54A, 54B are formed to become smaller in order from the front side to the rear side in the vehicle front-rear direction so that the crash box 22 is gradually deformed in a compressive manner along the axial direction from the front side to the rear side in the vehicle front-rear direction.

As illustrated in FIG. 2, the radiator support 60 is disposed on the inner side of the crash box 22 in the vehicle width direction so as to have a hat-like section that is opened toward the crash box 22 (the outer side in the vehicle width direction). More specifically, the radiator support 60 includes: a body portion 60A forming a generally U-shaped section that is opened toward the crash box 22; a front flange portion 60F extending from a front open end of the body portion 60A in the vehicle front-rear direction toward the front side in the vehicle front-rear direction; a rear flange portion 60R extending from a rear open end of the body portion 24A in the vehicle front-rear direction toward the rear side in the vehicle front-rear direction.

The front flange portion 60F and the rear flange portion 60R are put on the inner wall portion 22A of the crash box 22, and are connected to the inner wall portion 22A of the crash box 22 by welding. Note that, in the present embodiment, the front flange portion 60F and the rear flange portion 60R are connected by spot welding to the inner wall portion 22A of the crash box 22 at two spots (indicated by marks "x" in the figure) distanced from each other in the vehicle up-down direction. Further, in the following description, a welded portion between the front flange portion 60F and the inner wall portion 22A of the crash box 22 is described as a front connection portion J1 as a first connection portion. Further, a welded portion between the rear flange portion 60R and the inner wall portion 22A of the crash box 22 is described as a rear connection portion J2 as a second connection portion.

As illustrated in FIG. 4, when viewed from the vehicle width direction, the front connection portion J1 is placed between the recessed portion 40A formed on the outer wall portion 22B of the crash box 22 and the recessed portion 30A formed on the inner wall portion 22A. That is, when viewed from the vehicle width direction, the front flange portion 60F of the radiator support 60 is connected to the inner wall portion 22A of the crash box 22 between the recessed portion 40A and the recessed portion 30A, that is, between one set of vulnerable portions adjacent to each other in the vehicle front-rear direction.

Similarly, when viewed from the vehicle width direction, the rear connection portion J2 is placed between the recessed portion 40B formed on the outer wall portion 22B of the crash box 22 and the recessed portion 30B formed on the inner wall portion 22A. That is, when viewed from the vehicle width direction, the rear flange portion 60R of the radiator support 60 is connected to the inner wall portion 22A of the crash box 22 between the recessed portion 40B and the recessed portion 30B, that is, between another set of vulnerable portions adjacent to each other in the vehicle front-rear direction. This causes the front flange portion 60F and the rear flange portion 60R of the radiator support 60 not to obstruct the compressive deformation of the crash box 22 along the axial direction.

Note that a concept of the vulnerable portions adjacent to each other in the vehicle front-rear direction when viewed from the vehicle width direction, as used herein, includes vulnerable portions adjacent to each other while being displaced in the vehicle up-down direction, e.g., the notch 50A and the recessed portion 30A.

Next will be described an operation of the vehicle front structure according to the present embodiment.

As illustrated in FIG. 1, in the vehicle front structure 10 according to the present embodiment, the bumper reinforcement 14 is connected to the front side members 16 via the crash boxes 22. The vehicle cooling device 28 is disposed inside the crash boxes 22 in the vehicle width direction. The vehicle cooling device 28 is supported by the crash boxes 22 via the radiator supports 60. When the collision load F is input to the crash box 22 from the bumper reinforcement 14 toward the rear side in the vehicle front-rear direction at the time of a front collision, for example, the outer wall portion 22B and the inner wall portion 22A of the crash box 22 are deformed in a compressive manner along the axial direction while bending in a waveform with each of the recessed portions 30A, 30B, 40A, 40B and each of the projection portions 42A, 42B as an apex, in a horizontal sectional view, as illustrated with the alternate long and two short dashes lines in FIG. 3. Hereby, a collision energy due to the front collision is absorbed.

Figure 5:
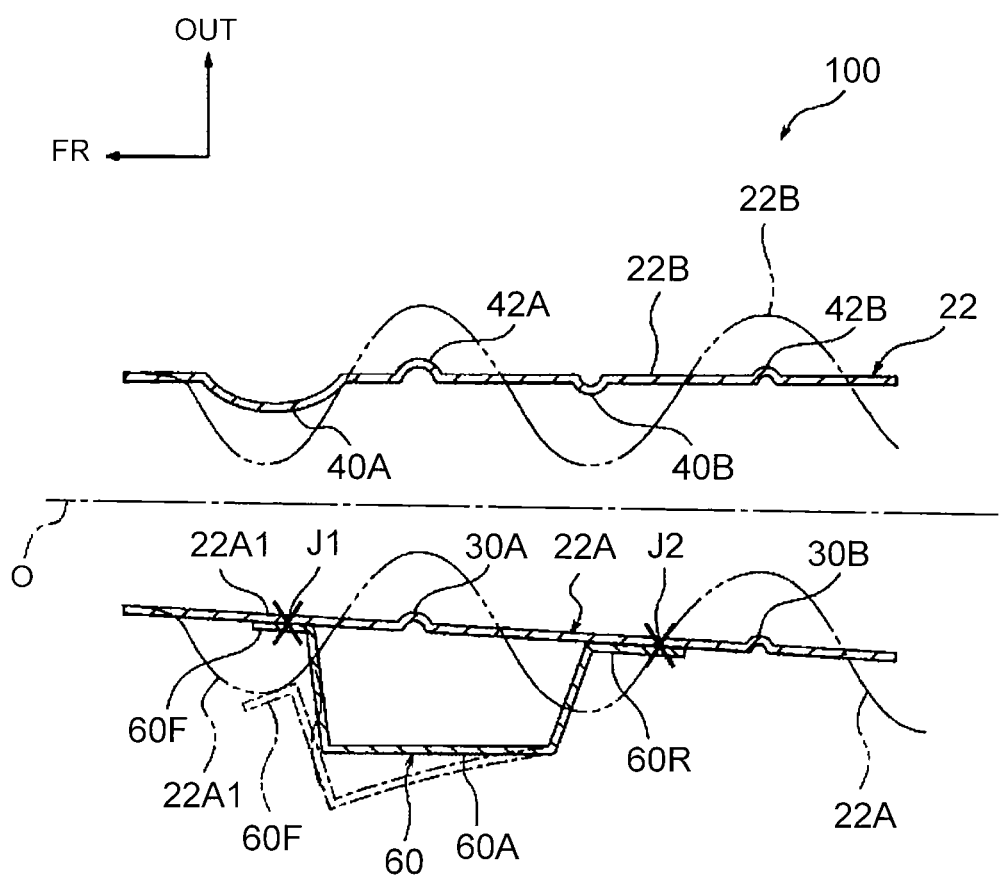
FIG. 5 is a horizontal sectional view corresponding to FIG. 3 and illustrates a crash box and a radiator support to which a modified embodiment of a vehicle front structure according to a comparative example is applied.

Here, in FIG. 5, a vehicle front structure 100 according to a comparative example is illustrated. In the vehicle front structure 100, a front flange portion 60F of a radiator support 60 is connected to an inner wall portion 22A of a crash box 22 by spot welding at a position where the front flange portion 60F is overlapped with a recessed portion 40A formed on an outer wall portion 22B of the crash box 22 when viewed from the vehicle width direction. That is, when viewed from the vehicle width direction, a front connection portion J1 is overlapped with the recessed portion 40A formed on the outer wall portion 22B of the crash box 22. Note that the other configuration of the vehicle front structure 100 according to the comparative example is the same as the vehicle front structure 10 according to the present embodiment.

As illustrated in FIG. 5, if the front connection portion J1 is overlapped with the recessed portion 40A formed on the outer wall portion 22B of the crash box 22 when viewed from the vehicle width direction, the radiator support 60 resists a bending deformation in which that part (hereinafter referred to as "bending deformation part") 22A1 of the inner wall portion 22A of the crash box 22 which is opposed to the recessed portion 40A is deformed in a projecting manner toward a side opposite to the outer wall portion 22B (toward the inner side in the vehicle width direction), as illustrated with an alternate long and two short dashes line, for example. That is, if the front flange portion 60F of the radiator support 60 is connected to the bending deformation part 22A1, the bending deformation part 22A1 is reinforced by the radiator support 60, so that an offset yield strength of the bending deformation part 22A1 becomes larger. Hereby, the bending deformation of the bending deformation part 22A1 is obstructed, which obstructs a compressive deformation of the crash box 22 along the axial direction. In this case, the crash box 22 may bend in an L-shape in a plane view, for example.

In contrast, in the present embodiment, as illustrated in FIG. 4, when viewed from the vehicle width direction, the front connection portion J1 is placed between the recessed portion 40A formed on the outer wall portion 22B of the crash box 22 and the recessed portion 30A formed on the inner wall portion 22A. This makes it possible to reduce a resisting force of the front flange portion 60F of the radiator support 60 against the bending deformation in which the bending deformation part 22A1 of the inner wall portion 22A of the crash box 22 bends in a projecting manner toward the side opposite to the outer wall portion 22B, in a horizontal sectional view, as illustrated with the alternate long and two short dashes line in FIG. 3. Note that, in the present embodiment, as illustrated with the alternate long and two short dashes line, the front flange portion 60F of the radiator support 60 follows the bending deformation of the bending deformation part 22A1, so as to be bent toward the body portion 60A of the radiator support 60.

Similarly, when viewed from the vehicle width direction, the rear connection portion J2 is placed between the recessed portion 40B formed on the outer wall portion 22B of the crash box 22 and the recessed portion 30B formed on the inner wall portion 22A. This makes it possible to reduce a resisting force of the rear flange portion 60R of the radiator support 60 against the bending deformation in which the inner wall portion 22A of the crash box 22 bends in a waveform in a horizontal sectional view, as illustrated with the alternate long and two short dashes line.

Thus, according to the vehicle front structure 10 of the present embodiment, the front flange portion 60F of the radiator support 60 is connected to the inner wall portion 22A of the crash box 22 between the recessed portion 40A and the recessed portion 30A adjacent to each other in the vehicle front-rear direction, and the rear flange portion 60R of the radiator support 60 is connected to the inner wall portion 22A of the crash box 22 between the recessed portion 40B and the recessed portion 30B adjacent to each other in the vehicle front-rear direction. This makes it possible to reduce a resisting force of the radiator support 60 against the compressive deformation of the crash box 22 along the axial direction. Accordingly, the crash box 22 is easy to be deformed in a compressive manner along the axial direction, thereby restraining a decrease in collision-energy absorption performance of the crash box 22.

Here, it is desirable that the front connection portion J1 be positioned in an intermediate part, in the vehicle front-rear direction, between the recessed portion 40A and the recessed portion 30A adjacent to each other when viewed from the vehicle width direction. This makes it possible to restrain the resisting force of the front flange portion 60F of the radiator support 60 against the bending deformation of the inner wall portion 22A of the crash box 22. Similarly, it is desirable that the rear connection portion J2 be positioned in an intermediate part, in the vehicle front-rear direction, between the recessed portion 40B and the recessed portion 30B adjacent to each other. This makes it possible to restrain the resisting force of the rear flange portion 60R of the radiator support 60 against the bending deformation of the inner wall portion 22A of the crash box 22.

Note that the intermediate part in the vehicle front-rear direction between the recessed portion 40A and the recessed portion 30A adjacent to each other, as used herein, indicates that part of the crash box 22 which is positioned between the recessed portion 40A and the recessed portion 30A and which excludes both ends thereof in the vehicle front-rear direction, when viewed from the vehicle width direction. In other words, the intermediate part in the vehicle front-rear direction between the recessed portion 40A and the recessed portion 30A adjacent to each other indicates that part of the crash box 22 which is positioned between the recessed portion 40A and the recessed portion 30A and which excludes a part in vicinity to the recessed portion 40A and a part in vicinity to the recessed portion 30A, when viewed from the vehicle width direction.

Further, when the front connection portion J1 is positioned in a central part, in the vehicle front-rear direction, between the recessed portion 40A and the recessed portion 30A adjacent to each other when viewed from the vehicle width direction, it is possible to restrain, to a minimum, the resisting force of the front flange portion 60F of the radiator support 60 against the bending deformation of the inner wall portion 22A of the crash box 22. Similarly, when the rear connection portion J2 is positioned in a central part, in the vehicle front-rear direction, between the recessed portion 40B and the recessed portion 30B adjacent to each other, it is possible to restrain, to a minimum, the resisting force of the rear flange portion 60R of the radiator support 60 against the bending deformation of the inner wall portion 22A of the crash box 22.

Note that a concept of the central part in the vehicle front-rear direction between the recessed portion 40A and the recessed portion 30A adjacent to each other, as used herein, includes not only an exact center (L/2) in the vehicle front-rear direction between the recessed portion 40A and the recessed portion 30A, but also some displacement in the vehicle front-rear direction due to assembly errors of the radiator support 60 with respect to the crash box 22.

Further, in the vehicle front structure 10 according to the present embodiment, a support bracket used in the conventional technique (e.g., Patent Document 1) is unnecessary, so that it is possible to reduce the number of components.

Further, when viewed from the vehicle width direction, the front flange portion 60F of the radiator support 60 is connected to the inner wall portion 22A of the crash box 22 between the recessed portion 40A and the recessed portion 30A adjacent to each other in the vehicle front-rear direction, and the rear flange portion 60R of the radiator support 60 is connected to the inner wall portion 22A of the crash box 22 between the recessed portion 40B and the recessed portion 30B adjacent to each other in the vehicle front-rear direction. This makes it possible to improve support performance of the radiator support 60 while restraining the resisting force of the radiator support 60 against the compressive deformation of the crash box 22 along the axial direction.

Next will be described modified embodiments of the vehicle front structure according to the above embodiment.

Figure 6:
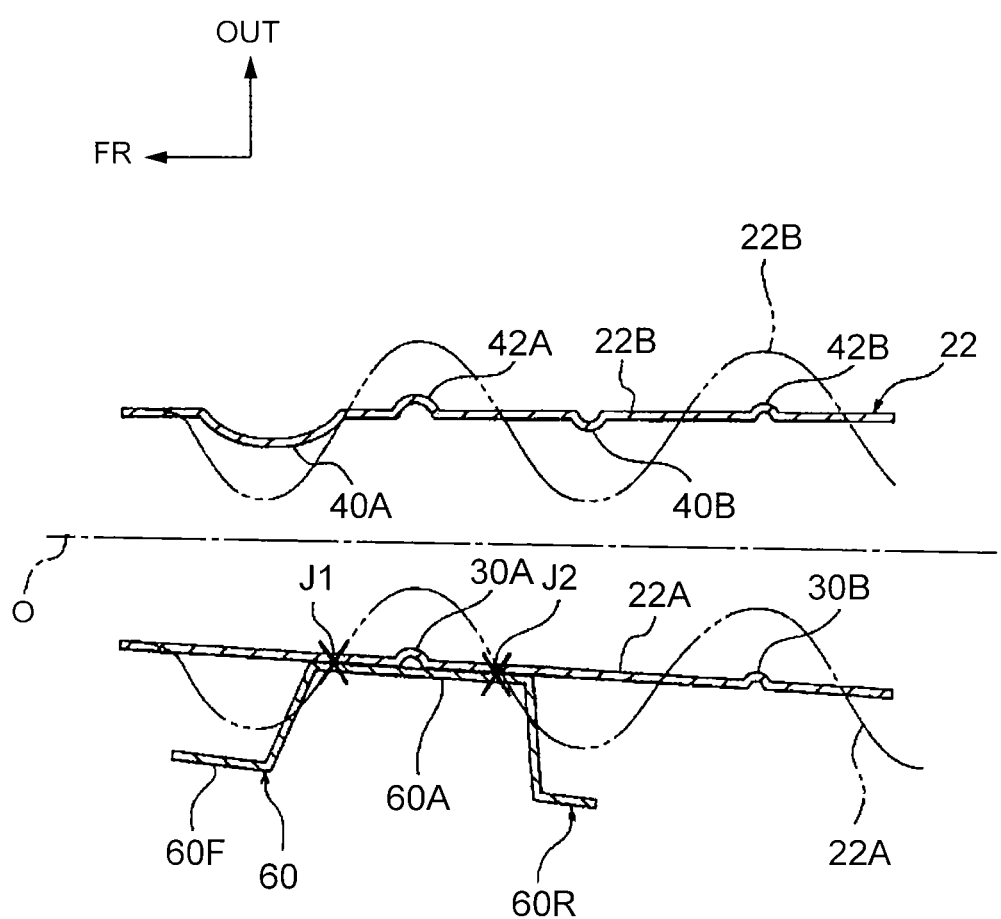
FIG. 6 is a horizontal sectional view corresponding to FIG. 3 and illustrates a crash box and a radiator support to which a modified embodiment of the vehicle front structure according to the one embodiment of the present invention is applied.

In the above embodiment, the front flange portion 60F and the rear flange portion 60R of the radiator support 60 are connected to the inner wall portion 22A of the crash box 22, but the present invention is not limited to this. For example, as illustrated in a modified embodiment in FIG. 6, a body-portion-60A side of a radiator support 60 may be put on an inner wall portion 22A of a crash box 22, so that the body portion 60A may be connected to the inner wall portion 22A of the crash box 22 at a front connection portion J1 and a rear connection portion J2 disposed at an interval in the vehicle front-rear direction. Even in this case, similarly to the above embodiment, the front connection portion J1 is positioned between a recessed portion 40A and a recessed portion 30A adjacent to each other in the vehicle front-rear direction, and the rear connection portion J2 is positioned between the recessed portion 30A and a recessed portion 40B adjacent to each other in the vehicle front-rear direction. This makes it possible to reduce a resisting force of the radiator support 60 against a compressive deformation of the crash box 22 along the axial direction.

Further, in the above embodiment, the radiator support 60 is formed to have a hat-like section, but the present invention is not limited to this. For example, the radiator support 60 may be formed in a tubular shape having a rectangular shape, or may be formed to have a generally L-shaped section.

Further, in the above embodiment, the front flange portion 60F and the rear flange portion 60R of the radiator support 60 are connected to the inner wall portion 22A of the crash box 22. However, at least one of the front flange portion 60F and the rear flange portion 60R may be connected to the inner wall portion 22A of the crash box 22.

Further, the above embodiment deals with an example in which the radiator support 60 is provided as a support member, but the present invention is not limited to this. The support member should be a member that supports the vehicle cooling device 28, and for example, a bracket or the like that connects the radiator support 60 to the front side member 16 may be usable. In this case, the bracket may be connected to the inner wall portion 22A and the outer wall portion 22B of the crash box 22, or may be connected to the upper wall portion 24A2 or the like of the body portion 24A in the crash box inner panel 24.

Further, the recessed portions 30A, 30B, 40A, 40B, the projection portions 42A, 42B, and the notches 50A, 50B, 52A, 52B, 54A, 54B formed in the crash box 22 are modifiable appropriately in terms of the numbers and positions thereof. Accordingly, for example, a plurality of first vulnerable portions disposed at intervals in the vehicle front-rear direction may be formed on the inner wall portion 22A of the crash box 22, and a plurality of second vulnerable portions may be formed on the outer wall portion 22B of the crash box 22 so as to be opposed, in the vehicle width direction, to the plurality of first vulnerable portions thus formed on the inner wall portion 22A. In this case, the radiator support 60 may be connected to the inner wall portion 22A of the crash box 22 between the first vulnerable portions adjacent to each other in the vehicle front-rear direction.

Further, in the crash box 22, through holes may be formed as vulnerable portions. Further, in the crash box 22, vulnerable portions selected appropriately from the recessed portions, the projection portions, the notches, and the through holes can be formed, and for example, only the notches may be formed in the crash box 22 without the recessed portions, the projection portions, and the through holes.

Figure 7:
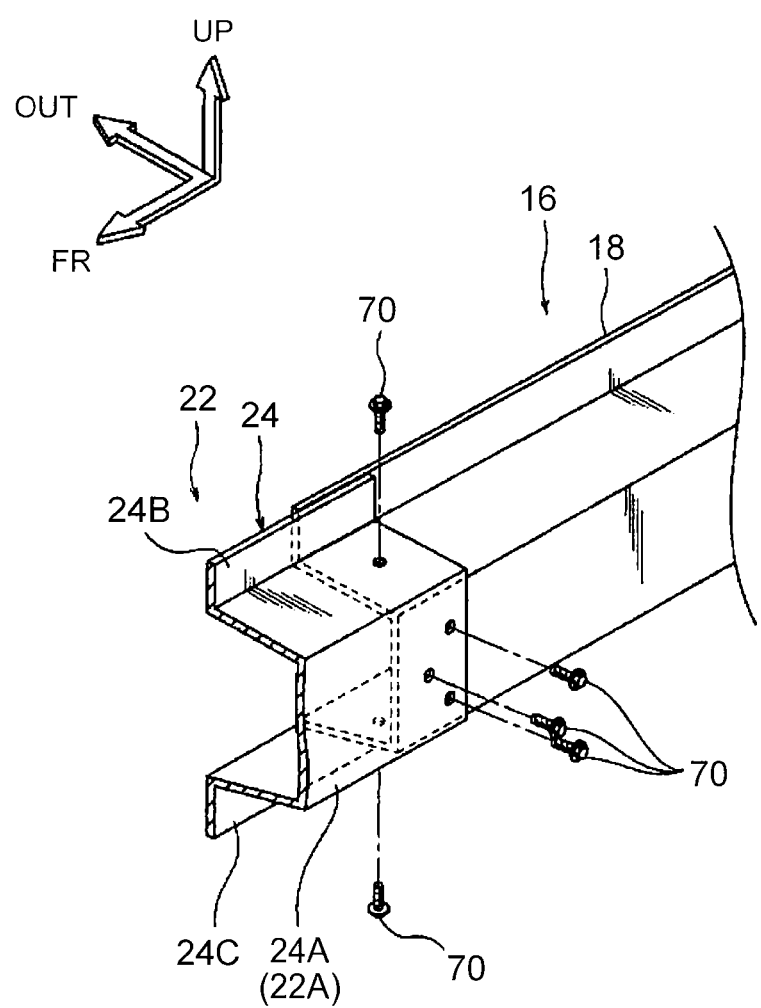
FIG. 7 is a perspective view illustrating a modified embodiment of the connecting structure between the crash box and the radiator support in the one embodiment of the present invention.

Further, shapes of the crash box 22 and the front side member 16, and a connecting structure between the crash box 22 and the front side member 16 are not limited to those described in the above description. For example, as illustrated in a modified embodiment in FIG. 7, an inner panel 24 of a crash box 22 may be fastened to an inner panel 18 of a front side member 16 via bolts 70 and nuts (not shown). Note that, in FIG. 7, an outer panel 26 of the crash box 22, an outer panel 20 of the front side member 16, and vulnerable portions are not illustrated.

Figure 8:
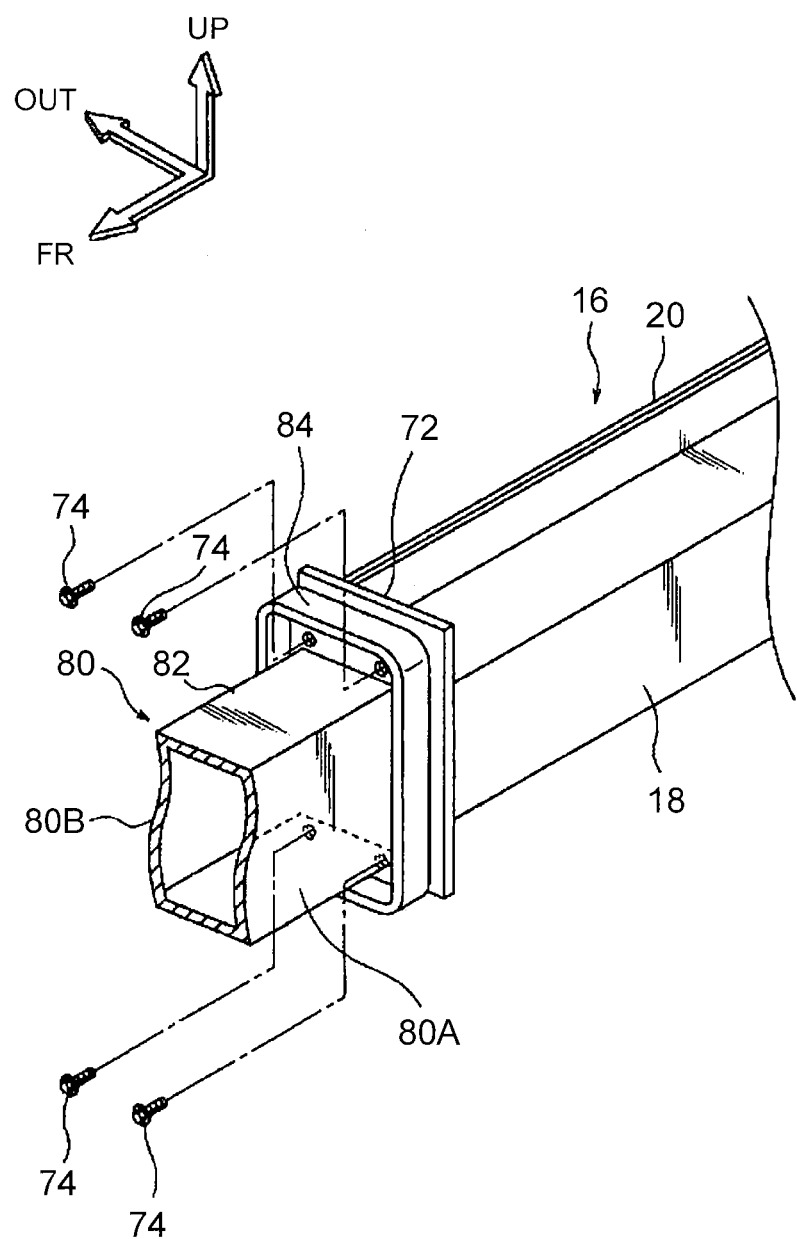
FIG. 8 is a perspective view illustrating a modified embodiment of the connecting structure between the crash box and the radiator support in the one embodiment of the present invention.

Further, in a modified embodiment illustrated in FIG. 8, a flange portion 72 is provided in a front end 16F of a front side member 16. Meanwhile, a crash box 80 includes a body portion 82 and a flange portion 84. The body portion 82 is formed in a tubular shape having a rectangular section, and includes an inner wall portion 80A and an outer wall portion 80B. A rear end of the body portion 82 in the vehicle front-rear direction is provided with a flange portion 84. The flange portion 84 is connected to the flange portion 72 provided in the front end 16F of the front side member 16, via bolts 74 and nuts (not shown). Note that, in FIG. 8, vulnerable portion are not illustrated.

As such, the shapes of the crash box 22 and the front side member 16, and the connecting structure between the crash box 22 and the front side member 16 are modifiable appropriately.

Further, all the documents, patent applications, and technical standards described in the present specification are hereby incorporated therein by reference to the same extent as in cases where each document, patent application or technical standard is specifically and individually described as being incorporated by reference.

One embodiment of the present invention has been explained as above, but the present invention is not limited to the above embodiment. It should be understood that the one embodiment and various modified embodiments may be employed in combination appropriately or the present invention may be performable in various aspects without departing from the gist of the present invention.

DESCRIPTION OF THE REFERENCE NUMERALS

10 . . . vehicle front structure
14 . . . bumper reinforcement
16 . . . front side member
16F . . . front end (front end of front side member)
22 . . . crash box
22A . . . inner wall portion (side wall portion of crash box)
28 . . . vehicle cooling device
30A . . . recessed portion (vulnerable portion)
30B . . . recessed portion (vulnerable portion)
40A . . . recessed portion (vulnerable portion)
40B . . . recessed portion (vulnerable portion)
42A . . . projection portion (vulnerable portion)
42B . . . projection portion (vulnerable portion)
50A . . . notch (vulnerable portion)
50B . . . notch (vulnerable portion)
52A . . . notch (vulnerable portion)
52B . . . notch (vulnerable portion)
54A . . . notch (vulnerable portion)
54B . . . notch (vulnerable portion)
60 . . . radiator support (support member)
60F . . . front flange portion
60R . . . rear flange portion
80 . . . crash box
80A . . . inner wall portion (side wall portion)
F . . . collision load (load)

The invention claimed is:

1. A vehicle front structure comprising:
a bumper reinforcement disposed on a vehicle front end side with a vehicle width direction as its longitudinal direction;
paired front side members disposed on respective sides of a vehicle front portion with a vehicle front-rear direction as their longitudinal direction;
paired crash boxes configured to connect the bumper reinforcement to respective front ends of the paired front side members in the vehicle front-rear direction, each of the paired crash boxes including at least three vulnerable portions formed thereon at intervals in the vehicle front-rear direction; and
paired support members each disposed with a vehicle up-down direction as its longitudinal direction and formed to have a hat-like shape, the paired support members being configured to support, relative to the paired crash boxes, a vehicle cooling device disposed between the crash boxes, wherein:
the support member includes:
a front flange portion connected to a side wall portion of the crash box between one set of the vulnerable portions adjacent to each other when viewed from the vehicle width direction, and
a rear flange portion disposed behind the front flange portion in the vehicle front-rear direction, the rear flange portion being connected to the side wall portion of the crash box between another set of the vulnerable portions adjacent to each other when viewed from the vehicle width direction.

2. The vehicle front structure according to claim 1, wherein:
the support member is connected to the crash box in an intermediate part between the vulnerable portions adjacent to each other when viewed from the vehicle width direction.

3. The vehicle front structure according to claim 1, wherein:
the support member is connected to the crash box in a central part between the vulnerable portions adjacent to each other when viewed from the vehicle width direction.

4. The vehicle front structure according to claim 1, wherein:
the vulnerable portions are notches, projection portions, recessed portions, or through holes formed in the crash box.

* * * * *